V. P. McKINNIE.
ADVERTISING DEVICE.
APPLICATION FILED NOV. 18, 1920.
1,415,596.    Patented May 9, 1922.
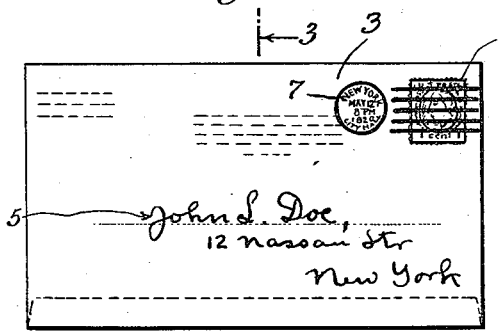
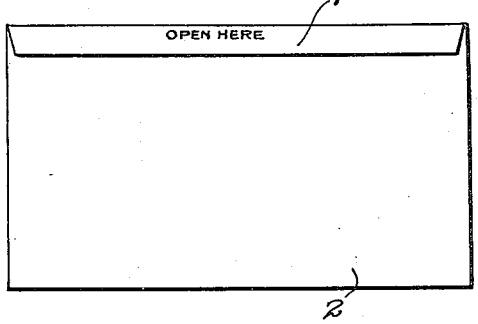
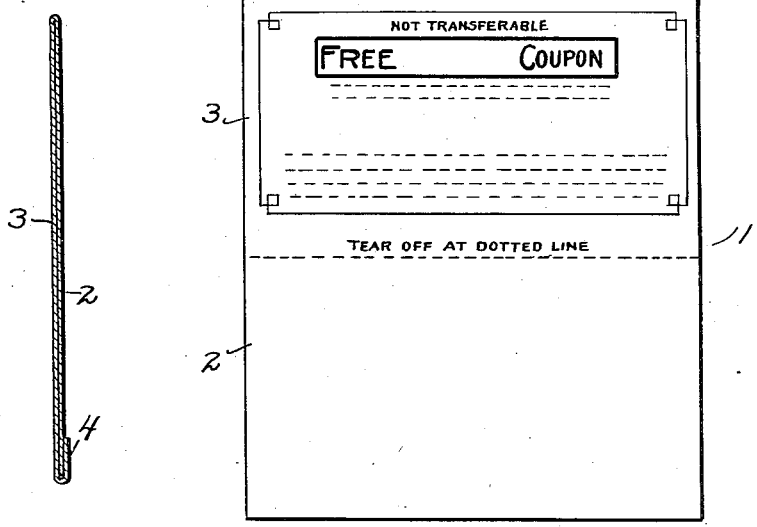
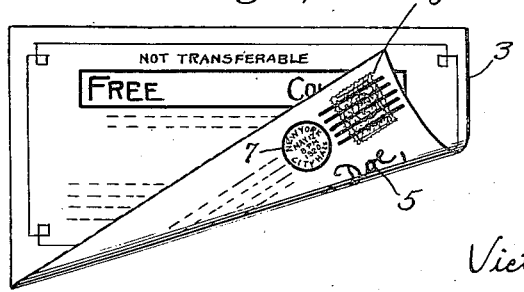
INVENTOR
Victor P. McKinnie
BY
Pennie, Davis, Marvin & Edmonds ATTORNEYS

UNITED STATES PATENT OFFICE.

VICTOR P. McKINNIE, OF NEW YORK, N. Y., ASSIGNOR TO WARD BAKING COMPANY, A CORPORATION OF NEW YORK.

ADVERTISING DEVICE.

1,415,596.  Specification of Letters Patent.  Patented May 9, 1922.

Application filed November 18, 1920. Serial No. 424,808.

*To all whom it may concern:*

Be it known that I, VICTOR P. McKINNIE, residing at New York, in the county of New York, State of New York, have invented certain new and useful Improvements in Advertising Devices; and I do hereby declare the following to be a full, clear, and exact description of the invention, such as will enable others skilled in the art to which it appertains to make and use the same.

This invention relates to an advertising device in the form of a mailing card, one part of which is printed in the form of a free coupon, the whole being designed to be sent through the mails for the postage required for postal cards and yet semi-sealed so that the nature of the coupon and the accompanying communication will be disclosed to the recipient only.

In order to introduce certain of their products to the public, manufacturers often adopt the plan of distributing trial samples to a selected list of consumers, free of charge. This is done either by actually sending the sample directly to the consumer, or more commonly by sending him a coupon which, when presented at a given place within a given time, will entitle him to a sample. When the product is an inexpensive one, such for example as a loaf of bread, an advertising project of this nature does not justify the expenditure of any large sum in the production and distribution of these coupons and yet, at the same time it is desirable that the coupon be marked with the particular consumer's name, to avoid indiscriminate and unauthorized use, and with the particular time period within which the offer holds and the coupon is redeemable. A coupon bearing the consumer's name and the date, mailed in an envelope addressed to the consumer would, of course, suffice but would be too expensive. Such a procedure would require two writings of the name and one writing of the date. Besides this, it would probably be necessary to use a sealed envelope requiring first class postage in order to assure attention. A simple mailing card itself constituting the coupon would avoid the difficulties enumerated above and would perhaps be satisfactory in a measure. But the use of such a card would afford no privacy and would probably fail to attract the attention of a certain percentage of addressees.

It is therefore an object of the present invention to devise a coupon of the class described which shall be inexpensive to distribute and which shall at the same time insure a certain privacy and be likely to attract the attention of those to whom it is sent.

This object is attained by making the coupon in the form of the common folder or return postal card, but having a gummed flap attached to the addressed half designed to overlap the other half and thus hold the two cards in contact with each other. The coupon itself is the addressed half of the card and the communication is printed on the other half which overlies the printed face of the coupon and protects it from public inspection. The person receiving the card separates the two halves, reads the communication and retains the coupon. This coupon can be used only by the person whose name appears upon it, the one writing of the name thus serving two purposes, first, as part of the address and, second, as an indentification. It is not necessary that the coupon be dated, as the date on the postmark suffices and thus fixes the time within which the coupon is redeemable.

The invention will be more clearly understood by referring to the accompanying drawings in which—

Figure 1 is a face view of the folded device as received through the mails; Figure 2 is a rear view thereof; Figure 3 is a section taken on line 3—3 of Fig. 1; Figure 4 is a view showing the device in an unfolded position, and Figure 5 is a view partly in perspective showing the detached coupon.

The device comprises a substantially rectangular sheet of paper or light cardboard 1 scored along two lines, as shown most clearly in Fig. 4 to form three sections, 2, 3 and 4. The outer sections 2 and 4 are adapted to be folded upon and cover one side of the intermediate section 3 in the manner shown in Figure 3. The intermediate section is designed to carry on its face the address 5 of the person to whom the advertising device is to be sent and a stamp 6, while the reverse side or back is printed in the form of a coupon announcing to what this coupon will entitle the holder, where the article may be obtained upon presentation and the time following the issuance of the coupon within which it may be redeemed. The face of the coupon section, during the passage of the device through the mails, will receive a postmark 7 which dates the coupon and indicates the time of issuance. The end sections 2 and 4 are folded upon the coupon section 3 in such a manner as to hide its reverse or coupon side and thus prevent disclosure of its true nature while passing through the mails.

As shown in the drawings, section 2 is made substantially the same size as the coupon section 3, whereas section 4 is shown as much narrower. This, of course, is not essential and these two sections may be made of substantially the same size, it being necessary only that when folded together they completely cover the coupon side of section 3 and overlap sufficiently to permit of their being fastened together. In the form shown, the inner face of strip 4 is gummed.

The inner face of section 2 can readily be employed to carry a communication and the outer side of this section some fanciful matter or advertisements.

In practice the end sections 2 and 4 are folded upon the intermediate section and pasted together. The address of the particular consumer is then placed upon the face of the coupon section and the device is ready for mailing. Upon receipt thereof the addressee tears off sections 2 and 4 along the scored lines, reads the communication on the inner face of section 2, and retains the postmarked and addressed coupon. If presented at the place indicated within a specified time from the postmarked-date, the addressee will receive the sample.

I claim:

1. An advertising device comprising a card folded so that its parts lie in contact, means for temporarily holding them in such relation, one of the parts being designed to bear an address and being printed in the form of a coupon.

2. An advertising device designed to be sent through the mails comprising two parts, one designed to bear an address on its face and its reverse side being printed in the form of a coupon, and the other part overlying the reverse side of the first part and temporarily connected thereto.

3. An advertising device designed to be sent through the mails comprising a coupon and a removable cover for the back of the coupon, the face of the coupon being adapted to carry an address thus identifying the user of the coupon with the addressee.

4. An advertising device designed to be sent through the mails comprising a card scored along two lines to form three detachable sections, the two outer sections being adapted to fold over and cover the back of the intermediate section, the face of the intermediate section being designed to carry an address and receive the postmark and the back of this section being printed in the form of a coupon, the arrangement being such that the address serves to identify the holder of the coupon with the addressee and the date of the postmark to indicate the date of issuance of the coupon.

In testimony whereof I affix my signature.

VICTOR P. McKINNIE.